(12) United States Patent
Tada et al.

(10) Patent No.: US 9,417,746 B2
(45) Date of Patent: Aug. 16, 2016

(54) TOUCH-PANEL SUBSTRATE

(71) Applicant: Sharp Kabushiki Kaisha, Osaka (JP)

(72) Inventors: Kenshi Tada, Osaka (JP); Noriko Watanabe, Osaka (JP); Kenji Misono, Osaka (JP); Yasumori Fukushima, Osaka (JP); Masaki Fujihara, Osaka (JP); Shinsuke Saida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 117 days.

(21) Appl. No.: 14/377,090

(22) PCT Filed: Feb. 8, 2013

(86) PCT No.: PCT/JP2013/053122
§ 371 (c)(1),
(2) Date: Aug. 6, 2014

(87) PCT Pub. No.: WO2013/118883
PCT Pub. Date: Aug. 15, 2013

(65) Prior Publication Data
US 2014/0375910 A1    Dec. 25, 2014

(30) Foreign Application Priority Data

Feb. 9, 2012 (JP) ................. 2012-026668

(51) Int. Cl.
*G06F 3/044* (2006.01)
*G06F 1/16* (2006.01)

(52) U.S. Cl.
CPC .............. *G06F 3/044* (2013.01); *G06F 1/1692* (2013.01); *G06F 2203/04103* (2013.01); *G06F 2203/04111* (2013.01)

(58) Field of Classification Search
CPC ... G06F 3/0488; G06F 3/04883; G06F 3/044; G06F 3/04886; G06F 3/045; G06F 1/16
See application file for complete search history.

(56) References Cited

U.S. PATENT DOCUMENTS

| | | | |
|---|---|---|---|
| 2010/0085326 A1 | 4/2010 | Anno | |
| 2010/0182275 A1* | 7/2010 | Saitou | G06F 3/044 345/174 |
| 2010/0295446 A1* | 11/2010 | Yamamoto | H01L 51/0021 313/504 |
| 2012/0075218 A1* | 3/2012 | Lin | G06F 3/0418 345/173 |
| 2013/0306459 A1 | 11/2013 | Anno | |

FOREIGN PATENT DOCUMENTS

| | | |
|---|---|---|
| JP | 2010-086498 A | 4/2010 |
| JP | 2010-170163 A | 8/2010 |

(Continued)

OTHER PUBLICATIONS

Kung et al., "Ultra-Thin High-Transparency Projective Capacitive Touch Sensing Film", SID 10 Digest, May 2010, pp. 449-452 (Mentioned in paragraph Nos. 18, 25, 28, and 42 of the as-filed specification.).

*Primary Examiner* — Md Saiful A Siddiqui
(74) *Attorney, Agent, or Firm* — Chen Yoshimura LLP (57) ABSTRACT

On a resin substrate (2) there are laminated, in the stated order, a conductive layer in which a bridge electrode (3b) and leads are formed, a first interlayer insulating layer (4), and an electrode layer that allows through visible light forming a unit electrode (5XU) of a drive electrode line (5X) and a unit electrode (5YU) of a sensing electrode line (5Y). It is accordingly possible to realize a touch panel substrate (1) capable of minimizing any increases in thickness, decreases in transmittance, complexity of terminal portions, and deterioration in optical characteristics.

12 Claims, 7 Drawing Sheets

(56) References Cited

FOREIGN PATENT DOCUMENTS

| JP | 2011-043628 A | 3/2011 |
| JP | 2011-060617 A | 3/2011 |
| JP | 2011-90657 A | 5/2011 |
| JP | 2012-025158 A | 2/2012 |
| WO | WO 2007/008518 * | 1/2007 |
| WO | 2010/150668 A1 | 12/2010 |
| WO | WO 2010/150668 * | 12/2010 |
| WO | 2011/162414 A1 | 12/2011 |

* cited by examiner

Terminal Portion

PRIOR ART

FIG. 10

PRIOR ART

FIG. 11

PRIOR ART

TOUCH-PANEL SUBSTRATE

TECHNICAL FIELD

The present invention relates to a touch panel substrate and a display device including the touch panel substrate.

BACKGROUND ART

In recent years, in order to achieve device miniaturization, display devices having a touch panel function in which the display unit and the input unit are integrally formed are in wide use. In particular, in mobile terminals such as mobile phones, PDAs (personal digital assistants), and table PCs, display devices having touch panels that can detect a position of contact if a finger or an input stylus is brought into contact with the surface of the display unit are widely used.

As touch panels, conventionally, various types of touch panels such as the so-called resistive film type (pressure-sensing) and the capacitive type are known, and among those, the so-called capacitive type touch panels using the capacitive method in which a contact position is detected by changes in capacitance are widely used in display devices for mobile devices.

Such capacitive touch panels are installed outside of the display panel and are widely used.

Figure 8:
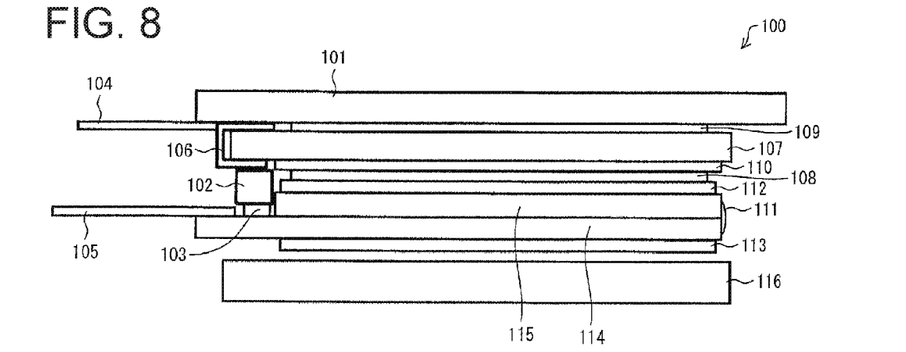
FIG. 8 shows a schematic configuration of a conventional capacitive touch panel disclosed in Patent Document 1.

In Patent Document 1, for example, a conventional capacitive touch panel such as that shown in FIG. 8 is disclosed.

As shown, a display device 100 including a conventional capacitive touch panel is configured as follows.

A liquid crystal display panel 111 includes a TFT substrate 114 and a color filter substrate 115, and between the two substrates 114 and 115, a liquid crystal layer (not shown) is sandwiched.

An upper polarizing plate 112 is provided on the top surface of the liquid crystal display panel 111, and a lower polarizing plate 113 is provided on the bottom surface of the liquid crystal display panel 111.

Also, on the bottom surface side of the liquid crystal display panel 111 (where the lower polarizing plate 113 is provided), a backlight 116 for radiating light to the liquid crystal display panel 111 is provided.

As shown, on one end of the TFT substrate 114, a driver circuit 103 and an FPC substrate 105 are provided.

On the other hand, the touch panel substrate 107 is bonded to the liquid crystal display panel 111 through a first adhesive 108, and on the surface of the touch panel substrate 107 facing the liquid crystal display panel 111, a transparent electrode layer 110 to be a shield layer that blocks noise originating from the liquid crystal display panel 111 is provided.

On the top surface of the touch panel substrate 107, a front surface protective plate 101 is bonded by a second adhesive 109.

A conductive member 106 for connecting the transparent electrode layer 110 to be the shield layer to ground potential is provided, and in addition, a spacer 102 is inserted between the touch panel substrate 107 and the TFT substrate 114.

Also, the FPC substrate 104 is connected to a touch panel control circuit (not shown), and sensor electrodes provided on the top surface of the touch panel substrate 107 and a control circuit (not shown) of the touch panel are electrically connected to each other through the FPC substrate 104. Also, an appropriate voltage such as ground potential is supplied through the FPC substrate 104 to the transparent electrode layer 110 provided on the bottom surface of the touch panel substrate 107. Thus, the FPC substrate 104 is connected to input terminals provided on the top surface of the touch panel substrate 107, and therefore, there is a need to provide wiring lines from the input terminals to the transparent electrode layer 110 provided on the bottom surface in order to electrically connect the input terminals to the transparent electrode layer 110.

Figure 9:
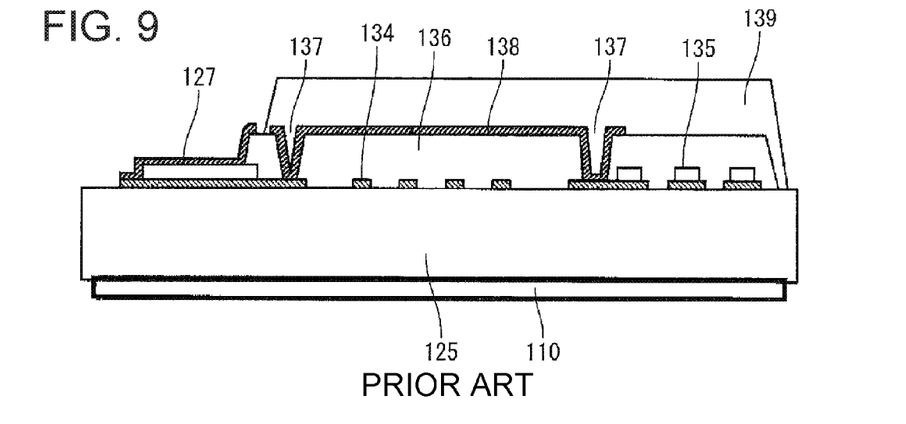
FIG. 9 shows another example of a conventional capacitive touch panel disclosed in Patent Document 1.

FIG. 9 shows another example of a conventional capacitive touch panel disclosed in Patent Document 1.

As shown, on the bottom surface of the touch panel substrate 125, a shield layer 110 is formed, while on the top surface of the touch panel substrate 125, an X sensor layer 134 and a Y sensor layer 138 made of a transparent conductive layer are formed. On portions of the X sensor layer 134, a wiring layer 135 made of a silver alloy is formed, and on the top surface of the touch panel substrate 125, a first insulating layer 136, contact holes 137 formed in the first insulating layer 136, and a second insulating layer 139 are provided.

A connecting terminal 127 has a structure in which the wiring layer 135 made of the silver alloy, and the Y sensor layer 138 are layered on the X sensor layer 134.

Figure 10:
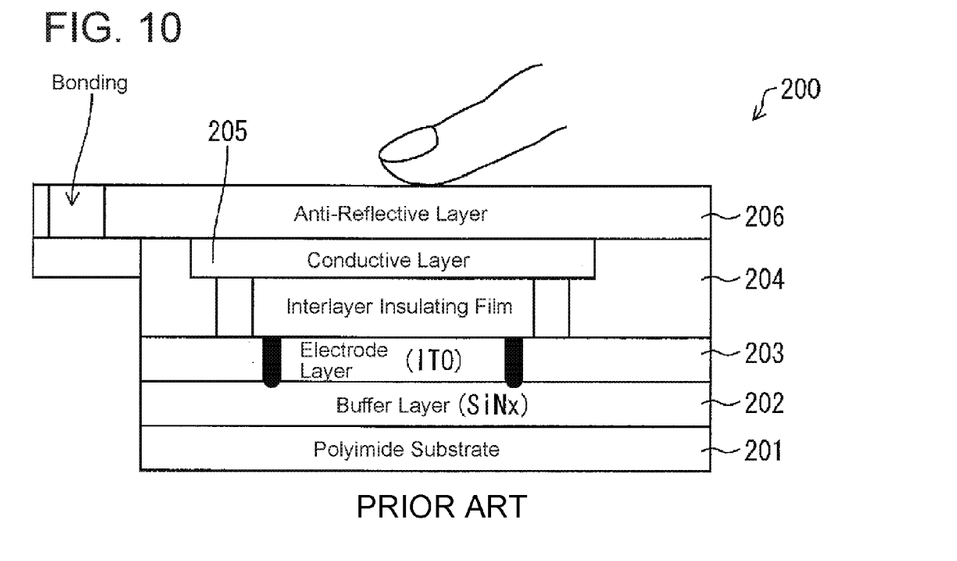
FIG. 10 shows a conventional thin touch panel substrate disclosed in Non-Patent Document 1.

Non-Patent Document 1 discloses the possibility of attaining a thin touch panel substrate 200 by forming a polyimide film on a glass substrate, then forming a sensor electrode layer, and peeling away the glass substrate, as shown in FIG. 10.

As shown in FIG. 10, the thin touch panel substrate 200 has a structure in which a buffer layer 202, electrode layers 203 made of a transparent conductive layer, an interlayer insulating layer 204, a conductive layer 205 for connecting two electrically separated electrode layers 203 through contact holes formed in the interlayer insulating layer 204, and an anti-reflective layer 206 are layered in that order on the polyimide substrate 201.

Figure 11:
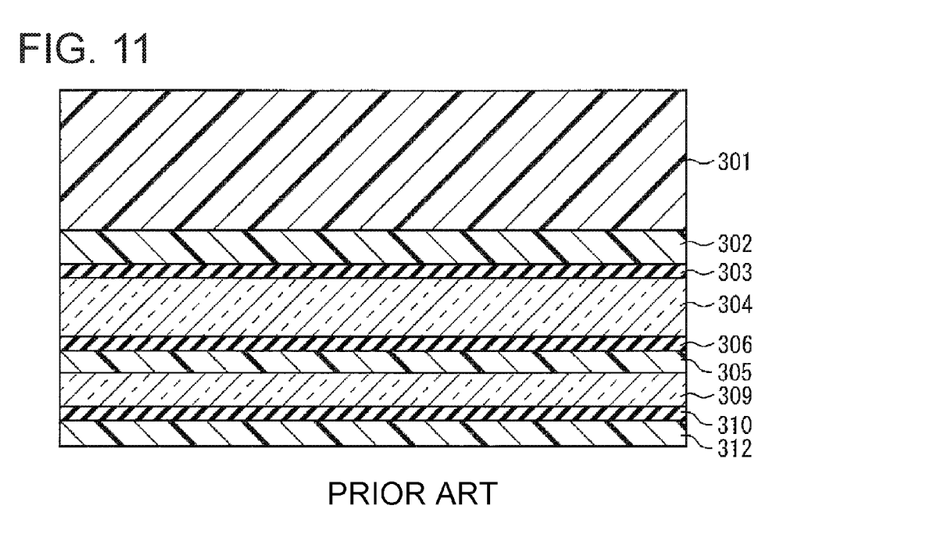
FIG. 11 shows a schematic configuration of a conventional capacitive touch panel disclosed in Patent Document 2.

Also, Patent Document 2 discloses a display device including a touch panel such as that shown in FIG. 11.

As shown, the touch panel substrate 304 is made of PET at a thickness of 0.1 to 0.2 mm, and an X sensor pattern 303 is formed on the top surface of the touch panel substrate 304, and a Y sensor pattern 306 is formed on the bottom surface of the touch panel substrate 304.

On the bottom surface of another PET substrate 309, a shield layer 310 is formed, and a hard coat material 312 for protecting the shield layer 310 is provided.

A surface panel 301 is bonded from the top side of the touch panel substrate 304 through an optical adhesive 302, and the other PET substrate 309 is bonded from the bottom side of the touch panel substrate 304 through an optical adhesive 305.

RELATED ART DOCUMENTS

Patent Documents

Patent Document 1: Japanese Patent Application Laid-Open Publication, "Japanese Patent Application Laid-Open Publication No. 2010-086498 (Published on Apr. 15, 2010)"

Patent Document 2: Japanese Patent Application Laid-Open Publication, "Japanese Patent Application Laid-Open Publication No. 2011-90657 (Published on May 6, 2011)"

Non-Patent Document

Non-Patent Document 1: C.-P. Kung, Ultra-Thin High-Transparency Projective Capacitive Touch Sensing Film, SID 10 DIGEST, 449-452, (2010)

SUMMARY OF THE INVENTION

Problems to be Solved by the Invention

However, a display device including the conventional capacitive touch panel disclosed in Patent Document 1 and shown in FIGS. 8 and 9 has the following problems.

The first problem is that in display devices that include capacitive touch panels, the thicker the capacitive touch panel substrate is, the thicker the display device is. The second problem is that the capacitive touch panel is stacked on the outside of the display panel, and thus, display quality of the display device decreases due to decrease in transmittance by the touch panel substrate. The third problem is that the sensor layers and the shield layers are formed on both surfaces of the touch panel substrate, and thus, it is not possible to form terminals on the same surface, which makes the configuration of the terminal installation portion complex and connection difficult. The fourth problem is that the wiring 135 made of the silver alloy is patterned after first forming the X sensor layer 134, and thus, when patterning the wiring layer 135, the X sensor layer 134 is damaged, thus worsening optical characteristics of the touch panel.

By using the configuration of the conventional capacitive touch panel disclosed in Non-Patent Document 1 and shown in FIG. 10, the first, second and third problems are mitigated to a certain extent, but in the configuration of the conventional capacitive touch panel shown in FIG. 10, the conductive layer 205 is patterned after forming the electrode layer 203, and thus, when patterning the conductive layer 205, the electrode layer 203 and the interlayer insulating layer 204 are damaged, which results in worsened optical characteristics in the touch panel, and fails to mitigate the fourth problem described above.

One method to mitigate the fourth problem described above is to use the configuration of the conventional touch panel shown in FIG. 11, but with such a configuration, an X sensor pattern 303 is formed on one side of the touch panel substrate 304 made of an already formed resin film made of PET or the like at a thickness of 0.2 mm, and a Y sensor pattern 306 is formed on the other side of the touch panel substrate 304, and in order to provide the shield layer 310, another PET substrate 309 besides the touch panel substrate 304 is used, and thus, the substrate as a whole becomes thick and the transmittance thereof is decreased, which means that the first problem and the second problem cannot be mitigated.

In the configuration above, the X sensor pattern 303, the Y sensor pattern 306, and the shield layer 310 are all formed as different layers, and thus, the third problem in which the terminals cannot be formed in the same layer, the terminal installing portion becomes complex, and connection becomes difficult cannot be mitigated.

The present invention takes into account the above-mentioned problems, and an object thereof is to provide a touch panel substrate by which it is possible to mitigate an increase in thickness, a decrease in transmittance, increasing complexity of the terminals, and a worsening of optical characteristics.

Means for Solving the Problems

In order to solve the above-mentioned problem, a touch panel substrate of the present invention includes, over a resin substrate, position detection electrodes that detect a coordinate position of an object to be detected by a change in capacitance, wherein the resin substrate allows through visible light and has a glass transition point of 150° or greater, wherein the position detection electrodes include a plurality of first electrodes arranged in a first direction, each of the first electrodes having unit electrodes arranged in a second direction that intersects with the first direction, and a plurality of second electrodes arranged in the second direction, each of the second electrodes having unit electrodes arranged in the first direction, wherein, at intersections between the first electrodes and the second electrodes, either two adjacent unit electrodes of the first electrodes or two adjacent unit electrodes of the second electrodes that are respectively adjacent to each other in a plan view are electrically connected by a connection electrode (bridge electrode) made of a conductive layer, the other thereof being electrically connected to each other over a first insulating layer that is formed over the connection electrode, wherein the unit electrodes of the first electrodes and the unit electrodes of the second electrodes are made of an electrode film (electrode layer) that allows through visible light, and wherein the touch panel further includes wiring lines connected to the position detection electrodes in a periphery thereof, the wiring lines being made of the conductive layer.

According to the configuration above, one resin substrate is used as the substrate of the touch panel substrate, and the one substrate is a resin substrate that allows through visible light, and that has a glass transition point of 150° or greater, and thus, it is possible to mitigate an increase in thickness of the touch panel substrate or a decrease in transmittance due to the substrate.

Also, according to the configuration above, a conductive layer that forms the bridge electrodes and the respective wiring lines, and the electrode layer that allows through visible light and that forms the unit electrodes of the first electrodes and the unit electrodes of the second electrodes are formed on one surface of the resin substrate, and thus, it is possible to form the terminal portion on one surface of the resin substrate. Therefore, it is possible to mitigate increased complexity of the terminal installation portion, and it is possible to connect the respective elements with relative ease.

Also, according to the configuration above, on the resin substrate, a conductive layer that forms the bridge electrodes and respective wiring lines, the first insulating layer, and an electrode layer that forms the unit electrodes of the first electrodes and the unit electrodes of the second electrodes and that allows through visible light are layered in that order.

Therefore, the electrode layer and the first insulating layer are formed above the conductive layer, and thus, during patterning of the conductive layer, the electrode layer and the first insulating layer are not yet formed, which means that the electrode layer and the first insulating layer are not damaged during patterning of the conductive layer.

The patterning of the conductive layer is performed on the highly planarized resin substrate, and thus, it is possible to form fine wiring lines.

Therefore, it is possible to form fine wiring lines while mitigating worsening optical characteristics in the touch panel substrate.

Thus, it is possible to attain a touch panel substrate by which it is possible to mitigate increase in thickness, decrease in transmittance, increase in complexity of the terminal portion, and worsening of optical characteristics.

Effects of the Invention

As stated above, in a touch panel substrate according to the present invention, the resin substrate allows through visible light and has a glass transition point of 150° or greater, the position detection electrodes include a plurality of first electrodes arranged in a first direction, each of the first electrodes having unit electrodes arranged in a second direction that intersects with the first direction, and a plurality of second electrodes arranged in the second direction, each of the second electrodes having unit electrodes arranged in the first direction, at intersections between the first electrodes and the second electrodes, either two adjacent unit electrodes of the first electrodes or two adjacent unit electrodes of the second electrodes that are respectively adjacent to each other in a plan view are electrically connected by a connection electrode made of a conductive layer, the other thereof being electrically connected to each other over a first insulating layer that is formed over the connection electrode, the unit electrodes of the first electrodes and the unit electrodes of the second electrodes are made of an electrode film that allows through visible light, and the touch panel further includes wiring lines connected to the position detection electrodes in a periphery thereof, the wiring lines being made of the conductive layer.

Thus, it is possible to attain a touch panel substrate by which it is possible to mitigate increase in thickness, decrease in transmittance, increase in complexity of the terminal portion, and worsening of optical characteristics.

DETAILED DESCRIPTION OF EMBODIMENTS

Below, embodiments of the present invention will be explained in detail with reference to figures. However, dimensions, materials, shapes, positional relationships, and the like of constituting members described in these embodiments are merely individual embodiment examples, and the scope of the present invention shall not be narrowly interpreted by being limited thereto.

In the respective embodiments below, examples are described of a liquid crystal display device, which includes a touch panel substrate of the present invention and a liquid crystal display panel, as the display device, but the configuration is not limited thereto, and the display device may be an organic EL display device including the touch panel substrate of the present invention and an organic EL display panel having an organic light-emitting layer, or an electrophoretic display device including the touch panel substrate of the present invention and an electrophoretic display panel.

<Embodiment 1>

Embodiment 1 of the present invention will be described below with reference to FIGS. 1 to 5.

Figure 3:
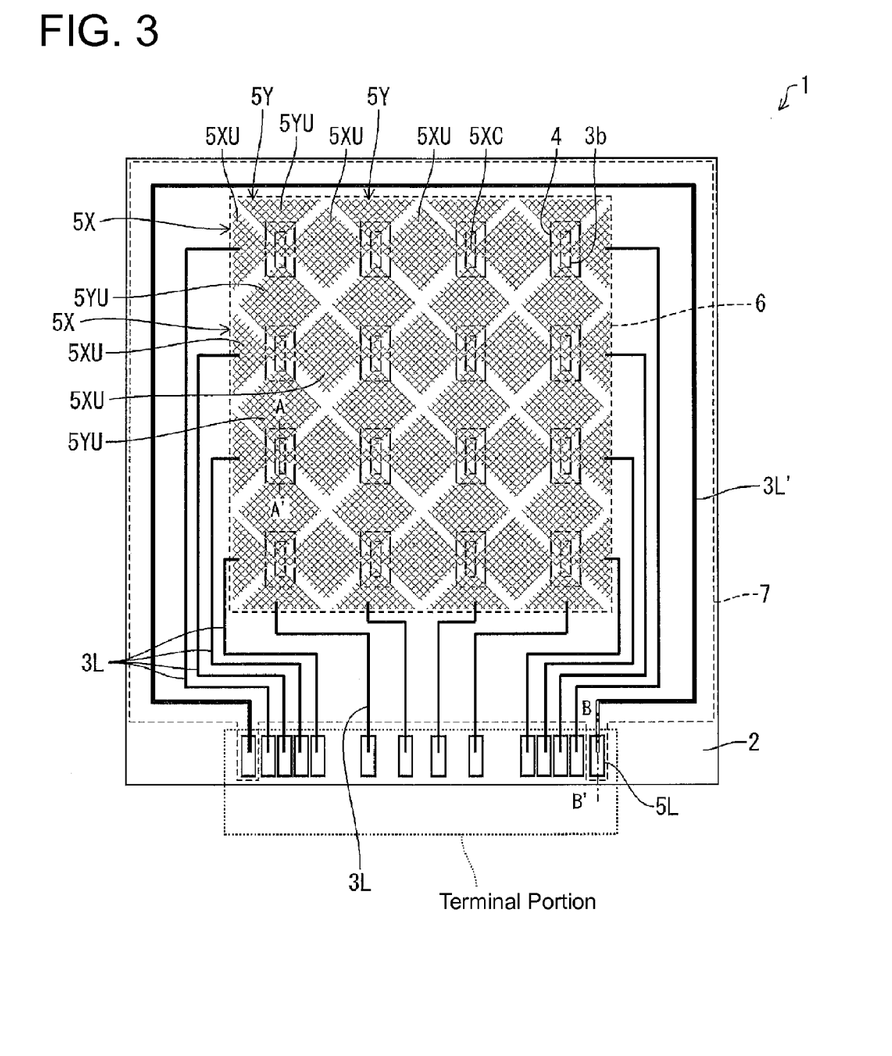
FIG. 3 is a plan view of the touch panel substrate included in the liquid crystal display device of the embodiment of the present invention.

FIG. 3 is a plan view that shows a touch panel substrate 1.

As shown, a plurality of drive electrode lines 5X arranged with prescribed gaps therebetween in a first direction (up-and-down direction in the drawing), and a plurality of sensing electrode lines 5Y arranged with prescribed gaps therebetween in a second direction (left-and-right direction in drawing) are formed on a substrate 2 so as to intersect each other.

The drive electrode lines 5X are constituted of adjacent unit electrodes 5XU, and connecting portions 5XC that connect adjacent unit electrodes 5XU, and the sensing electrode lines 5Y are constituted of adjacent unit electrodes 5YU that are electrically separate from each other, and bridge electrodes 3b that electrically connect electrically separated adjacent unit electrodes 5YU.

Figure 1:
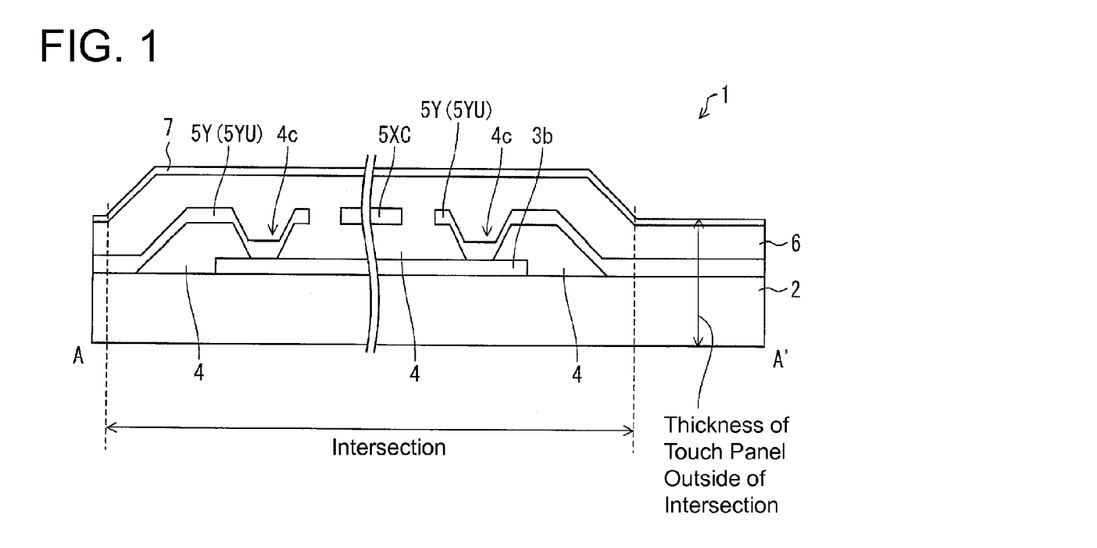
FIG. 1 is a cross-sectional view of a touch panel substrate provided in a liquid crystal display device of an embodiment of the present invention along the line A-A' shown in FIG. 3, and shows an intersection between a sensing electrode line and a drive electrode line.

FIG. 1 is a cross-sectional view of the touch panel substrate 1 shown in FIG. 3 along the line A-A', and shows the intersection between the drive electrode line 5X and the sensing electrode line 5Y.

As shown in FIG. 1, in the intersection between the drive electrode line 5X and the sensing electrode line 5Y constituting position detection electrodes that detect the coordinate position of an object to be detected by changes in capacitance, the electrically separate adjacent unit electrodes 5YU that constitute the sensing electrode line 5Y are electrically connected to each other through the bridge electrodes 3b.

In the present embodiment, two contact holes 4C formed in a first interlayer insulating film 4 covering the bridge electrode 3b are used in order to electrically connect the respective electrically separated adjacent unit electrodes 5YU to the common bridge electrode 3b, thus electrically connecting the electrically separated adjacent unit electrodes 5YU, but the configuration is not limited thereto, and the electrically separated adjacent unit electrodes 5YU may respectively be formed on the one common bridge electrode 3b without the use of contact holes.

The connecting portion 5XC of the drive electrode line 5X is formed on the first interlayer insulating film 4 formed on the bridge electrode 3b.

Thus, as shown, in the intersection between the drive electrode line 5X and the sensing electrode line 5Y, the first interlayer insulating film 4 insulates the drive electrode line 5X from the sensing electrode line 5Y.

A second interlayer insulating film 6 is formed so as to cover the drive electrode line 5X, the unit electrodes 5YU of the sensing electrode line 5Y, and the first interlayer insulating film 4, and a shield electrode 7 is formed so as to cover the second interlayer insulating film 6.

According to this configuration, a shield electrode 7 that blocks external signal noise is provided, and thus, a touch panel substrate 1 with a high detection accuracy can be attained.

In the present embodiment, a polyimide substrate made of polyimide at a thickness of a few μm to a few tens of μm is used as the substrate 2.

It is preferable that the polyimide substrate have a high transmittance in the visible light spectrum.

By using such a polyimide substrate, it is possible to mitigate an increase in thickness or a decrease in transmittance in the touch panel substrate that could otherwise occur depending on the substrate used.

Also, it is possible to bend the touch panel substrate.

The substrate 2 can be made of a substrate other than the polyimide substrate, and any substrate can be used as long as it allows through visible light, and as long as it is a resin substrate having a glass transition point of 150° or higher.

Also, in the present embodiment, a polyimide layer to be the polyimide substrate is formed on a support glass substrate that supports the polyimide substrate, and the polyimide layer is peeled from the support glass substrate, thus forming the polyimide substrate.

When peeling the polyimide substrate from the support glass substrate, it is preferable that light such as a laser beam be radiated on the polyimide substrate and the support glass substrate, thus decreasing the bonding strength between the polyimide layer and the support glass substrate, and peeling off the polyimide substrate thereafter.

According to this configuration, the polyimide substrate can be formed thin, and it is possible to achieve a thin touch panel substrate 1.

As shown in FIG. 3, the respective wiring lines 3L connected to the drive electrode lines 5X and the sensing electrode lines Y are provided in the periphery of the position detection electrode formation region including the plurality of drive electrode lines 5X and the plurality of sensing electrode lines 5Y, and the wiring lines 3L are drawn to the terminal portion formed on one end of the substrate 2.

Further to the outside than the wiring lines 3L, ground potential wiring lines 3L' that are grounded are provided, and like the wiring lines 3L are drawn to the terminal portion formed on one end of the substrate 2.

In other words, as shown in FIG. 3, it is preferable that the ground potential wiring lines 3L' be formed so as to surround the periphery, thereby increasing the resistance to noise coming from a horizontal direction, and increasing resistance to ESD damage that would occur during the manufacturing process.

The wiring lines 3L and the ground potential wiring line 3L' are formed in the same layer as the bridge electrodes 3b, and in the terminal portion of the substrate 2, the electrode layer 5L that forms the drive electrode lines 5X and the unit electrodes 5YU of the sensing electrode line 5Y is layered on the on the wiring lines 3L and the ground potential wiring lines 3L'.

Figure 2:
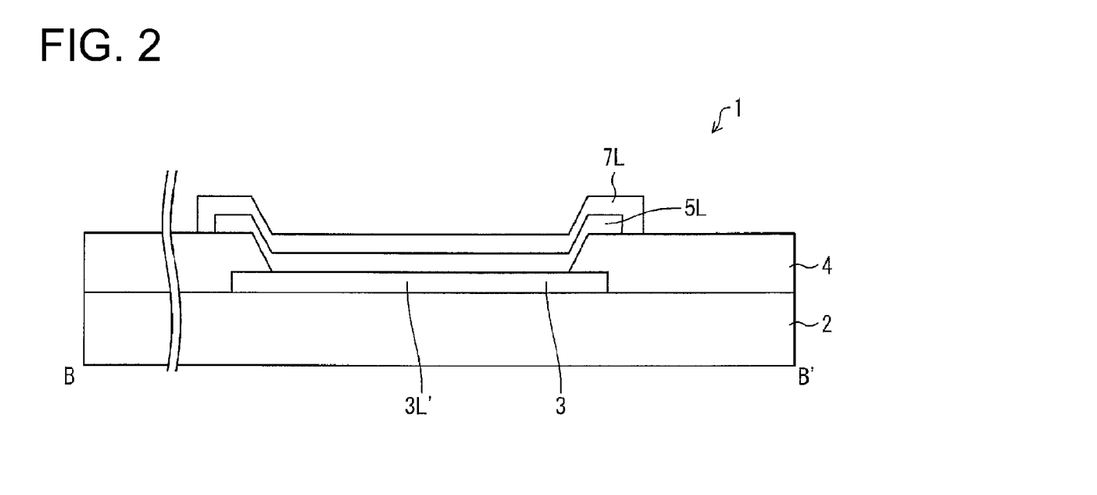
FIG. 2 is a cross-sectional view of the touch panel substrate provided in the liquid crystal display device of the embodiment of the present invention along the line B-B' shown in FIG. 3, and shows a terminal portion for a ground potential wiring line.

FIG. 2 is a cross-sectional view of the touch panel substrate 1 shown in FIG. 3 along the line B-B', and shows the terminal portion of the ground potential wiring line 3L'.

As shown, in the terminal portion of the substrate 2, the electrode layer 5L forming the drive electrode line 5X and the unit electrodes 5YU of the sensing electrode line 5Y, and the electrode layer 7L forming the shield electrode 7 are layered on the ground potential wiring line 3L'.

According to the configuration above, it is possible to electrically connect the shield electrode 7 to the ground potential wiring line 3L' with relative ease.

In such a case, by grounding only the terminal portion of the ground potential wiring line 3L', it is also possible to ground the shield electrode 7, and thus, it is possible to simplify the connection between the shield electrode 7 and the outer portion of the ground potential wiring line 3L'.

In the present embodiment, although not shown, the wiring lines 3L and the ground potential wiring line 3L' are formed of the same layer as the bridge electrode 3b, and thus, the first interlayer insulating layer 4 is formed so as to cover the wiring lines 3L and the ground potential wiring line 3L'.

Therefore, because the respective wiring lines 3L and 3L' are covered by the first interlayer insulating layer 4, it becomes possible to make the respective wiring lines 3L and 3L' durable when patterning the drive electrode lines 5X and the unit electrodes 5YU of the sensing electrode lines 5Y, and it is possible to improve reliability.

The formation region for the second interlayer insulating layer 6 and the shield electrode 7 will be described with reference to FIG. 3.

As shown, the second interlayer insulating layer 6 is formed in the region indicated with the inner dotted line, which is the formation region for the position detection electrodes in FIG. 3, and in FIG. 3, the shield electrode 7 is formed in the region indicated with the outer dotted line. Thus, in the present embodiment, only the first interlayer insulating layer 4 is formed on the wiring lines 3L and the ground potential wiring line 3L'.

Thus, in the formation region for the position detection electrodes where the second interlayer insulating layer 6 is formed, the shield electrode 7 is formed on the second interlayer insulating layer 6, and in the region peripheral to where the position detection electrodes are formed where only the first interlayer insulating layer 4 is formed, the shield electrode 7 is formed on the first interlayer insulating layer 4.

With such a configuration, it is possible to attain an even thinner touch panel substrate 1.

In the present embodiment, in order to make the connection with the FPC easier, as shown, in the terminal portion, the first interlayer insulating layer 4 is formed on the respective wiring lines 3L and 3L' so as to maintain insulation therebetween without forming both the first interlayer insulating layer 4 and the second interlayer insulating layer 6.

In the touch panel substrate 1 described above, the conductive layer 3 that forms the bridge electrodes 3b and the respective wiring lines 3L and 3L', the electrode layer that forms the drive electrode lines 5X and the unit electrodes 5YU of the sensing electrode lines 5Y, and the shield electrode 7 are formed on one surface of the substrate 2, and thus it is possible to form the terminal portion on one surface of the substrate 2. Therefore, despite the shield electrode 7 being provided, it is possible to mitigate an increase in complexity of the terminal installation portion, and it is possible to have a relatively easy connection without the use of other conductive members.

Also, in the touch panel substrate 1 described above, the conductive layer that forms the bridge electrodes 3b and the respective wiring lines 3L and 3L', the first interlayer insulating layer 4, the electrode layer that forms the drive electrode line 5X and the unit electrodes 5YU of the sensing electrode lines 5Y are layered in that order on the substrate 2.

Therefore, because the electrode layer is above the conductive layer, during patterning, the electrode layer has not yet been formed, and thus, there is no damage to the electrode layer or the first interlayer insulating layer during patterning (dry etching, for example) of the conductive layer. Thus, it is possible to mitigate worsening of optical characteristics of the touch panel substrate 1.

It is possible to perform detailed patterning on the conductive layer 3 through dry etching without damaging the electrode layer or the first interlayer insulating layer, and thus, it is possible to form the respective wiring lines 3L and 3L' in a small region, which allows for a small frame region.

Thus, it is possible to attain a touch panel substrate 1 by which it is possible to mitigate increase in thickness, decrease in transmittance, increase in complexity of the terminal portion, and worsening of optical characteristics.

As shown in FIG. 3, in the present embodiment, in the terminal portion of the touch panel substrate 1, the electrode layer 5L that forms the drive electrode lines 5X and the unit electrodes 5YU of the sensing electrode line 5Y is layered on the respective wiring lines 3L connected to the drive electrode lines 5X and the sensing electrode line 5Y in the terminal portion of the touch panel substrate 1, but the configuration is not limited thereto as long as at least one layer among the electrode layer 5L and the layer forming the shield electrode 7 is layered on the respective wiring lines 3L.

As shown in FIG. 3, in the present embodiment, the electrode layer 5L forming the drive electrode line 5X and the unit electrodes 5YU of the sensing electrode line 5Y and the layer forming the shield electrode 7 are layered on the ground potential wiring lines 3L' in the terminal portion of the touch panel substrate 1, but the shield electrode 7 may be the only layer formed. Also, if it is necessary to connect the ground potential wiring line 3L' to the shield electrode 7, only the electrode layer 5L may be formed on the ground potential wiring line 3L'.

As described above, in the terminal portion, the electrode layer 5L and the shield electrode 7 made of ITO (indium tin oxide), IZO (indium zinc oxide), or the like are formed on the respective wiring lines 3L and 3L', and thus, it is possible to mitigate corrosion of the respective wiring lines 3L and 3L'.

Also, in the present embodiment, it is possible to form the conductive layer 3 that forms the bridge electrodes 3b and the respective wiring lines 3L and 3L' of a metal such as a low resistance metal such as titanium (Ti), copper (Cu), gold (Au), aluminum (Al), tungsten (W), zinc (Zn), nickel (Ni), tin (Sn), chromium (Cr), molybdenum (Mo), or tantalum (Ta), a metal compound or metal silicide thereof, or the like. A layered metal can also be used.

The electrode layer forming the drive electrode lines 5X and the unit electrodes 5YU of the sensing electrode lines 5Y and the shield electrode 7 can be made of ITO (indium tin oxide) or IZO (indium zinc oxide) that allows through visible light.

The first interlayer insulating layer 4 and the second interlayer insulating layer 6 can be made of an inorganic material such as a photosensitive acrylic resin, a silicon nitride film, a silicon oxide film, or a silicon nitride oxide film, or a hybrid material including a mixture of an organic material and an inorganic material.

In the present embodiment, the conductive layer 3 that forms the bridge electrodes 3b and the respective wiring lines 3L and 3L' are formed on the substrate 2, but the conductive layer 3 may be formed after forming a nitride film to be a barrier layer on the substrate 2.

In the present embodiment, the first interlayer insulating layer 4 is a resin layer, and is formed so as to cover the only the bridge electrodes 3b and the respective wiring lines 3L and 3L'. The second interlayer insulating layer 6 is also made of a resin layer.

(Liquid Crystal Display Device)

Figure 4:
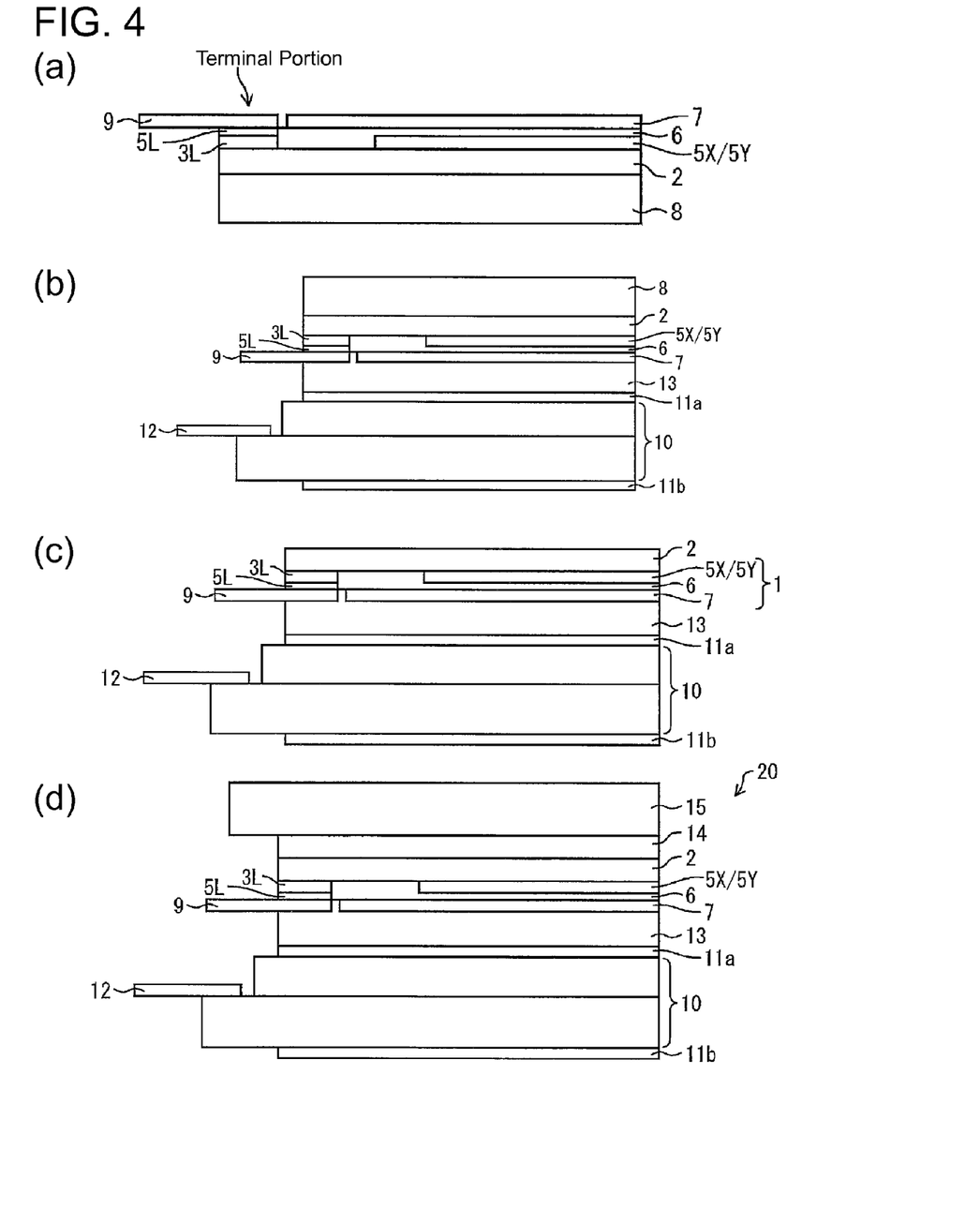
FIG. 4 shows manufacturing steps for the liquid crystal display device of the embodiment of the present invention.

FIG. 4 shows the manufacturing process for the liquid crystal display device 20 including the touch panel substrate 1.

FIG. 4(a) shows a case in which the touch panel substrate 1 shown in FIG. 3 is formed on the support substrate 8, and does not show the first interlayer insulating layer 4.

In the terminal portion, the electrode layer 5L that forms the drive electrode lines 5X and the unit electrodes 5YU of the sensing electrode lines 5Y is formed on the respective wiring lines 3L connected to the drive electrode lines 5X and the sensing electrode line 5Y, and the FPC 9 is connected thereto from above.

On the other hand, although not shown, on both ends of the terminal portion, the electrode layer 5L that forms the drive electrode lines 5X and the unit electrodes 5YU of the sensing electrode lines 5Y and the shield electrode 7 are layered on the ground potential wiring line 3L' and the FPC 9 is connected thereto from above.

Then, as shown in FIG. 4(b), the FPC 12 is connected to the liquid crystal display panel 10, which includes the upper polarizing plate 11a on the top surface (display surface) thereof and the lower polarizing plate 11b on the bottom surface thereof. The upper polarizing plate 11a is bonded to the FPC 9 and the shield electrode 7 through the adhesive layer 13, with the support substrate 8 being on top.

Then, as shown in FIG. 4(c), the support substrate 8 is removed by radiating light such as a laser beam.

Lastly, as shown in FIG. 4(d), the substrate 2 and the protective plate 15 are bonded to each other through the adhesive layer 14, which completes the liquid crystal display device 20 including the touch panel substrate 1.

The liquid crystal display device 20 includes the touch panel substrate 1 by which it is possible to mitigate an increase in thickness, a decrease in transmittance, increasing complexity of the terminals, and a worsening of optical characteristics, and thus, it is possible to attain a thin display device with improved display quality.

(Modification Example)

Figure 5:
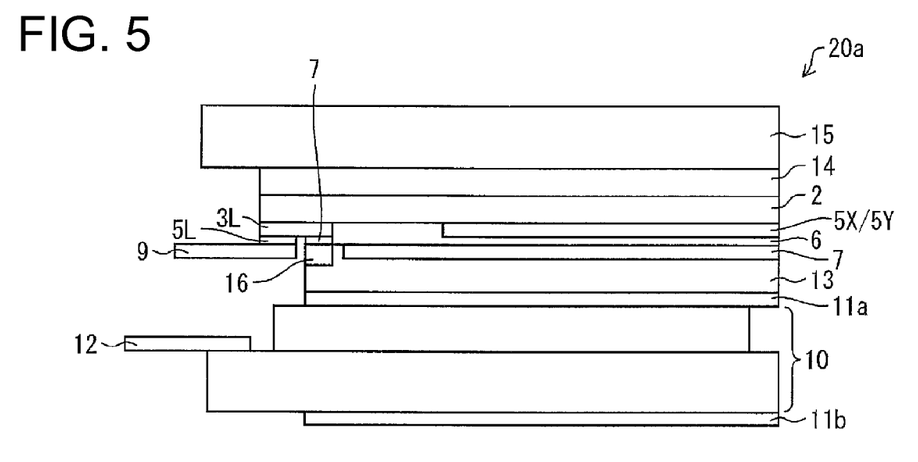
FIG. 5 shows the liquid crystal display device of the embodiment of the present invention including a touch panel substrate provided with COG (LSI).

FIG. 5 shows a liquid crystal display device 20a including a touch panel substrate provided with a COG 16 (LSI).

As shown, in the touch panel substrate including the liquid crystal display device 20a, the installation portion for the FPC 9 is located far from the protective plate 15.

Also, as shown, the installation surface on the touch panel substrate is opposite to the protective plate 15, and thus, it is possible to install the COG 16 (LSI) without taking into consideration the thickness of the protective plate 15, the touch panel substrate, and the adhesive layer 14, and thus, it is possible to simplify peripheral circuits of the touch panel substrate.

The COG 16 (LSI) is electrically connected to the respective wiring lines 3L and 3L' through the shield electrode 7.

<Embodiment 2>

Embodiment 2 of the present invention will be described with reference to FIG. 6. In a touch panel substrate 1a of the present embodiment, the shape of the shield electrode 7a differs from that of Embodiment 1. Other configurations are the same as described in Embodiment 1. For ease of description, members that have the same functions as members shown in drawings of Embodiment 1 will be assigned the same reference characters, and descriptions thereof will be omitted.

Figure 6:
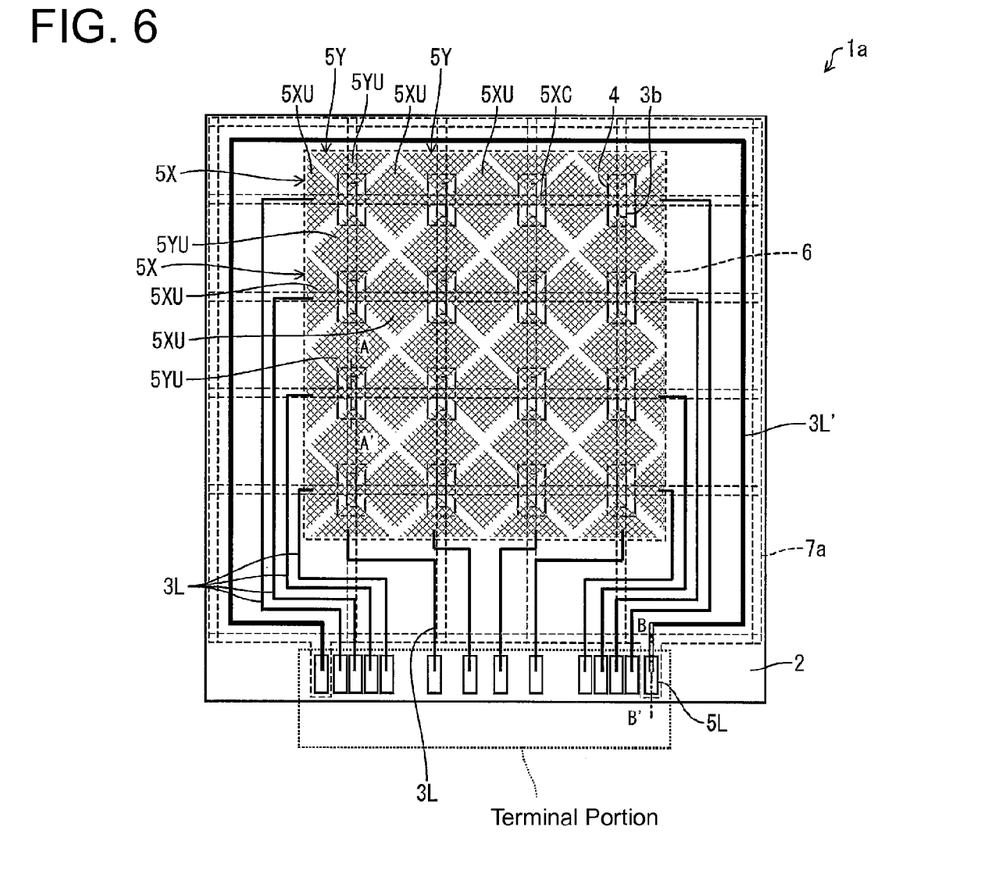
FIG. 6 is a plan view showing a schematic configuration of a touch panel substrate provided in a liquid crystal display device of another embodiment of the present invention.

FIG. 6 is a plan view that schematically shows a touch panel substrate 1a.

As shown, the shield electrode 7a in the touch panel substrate 1a has a small area of overlap with the unit electrodes 5XU of the drive electrode lines 5X and the unit electrodes 5YU of the sensing electrode lines 5Y in a plan view.

In other words, the shield electrode 7a of the touch panel substrate 1a has line portions respectively aligned in a first direction (up-and-down direction in the drawing) and a second direction (left-and-right direction in the drawing) so as to intersect at intersections between the drive electrode lines 5X and the sensing electrode lines 5Y.

The shield electrode 7a has a small area of overlap with the unit electrodes 5XU of the drive electrode lines 5X and the unit electrodes 5YU of the sensing electrode lines 5Y in a plan view, and has line portions that can be patterned at a high degree of accuracy. Also, the line portions overlap the centers of the unit electrodes 5XU of the drive electrode lines 5X and the unit electrodes 5YU of the sensing electrode lines 5Y, and can efficiently reduce noise.

The shape of the shield electrode 7a is not limited to the shape shown in FIG. 6 as long as the area of overlap with the unit electrodes 5XU of the drive electrode lines 5X and the unit electrodes 5YU of the sensing electrode lines 5Y is small in a plan view.

If the area of overlap between the shield electrode and the unit electrodes 5XU of the drive electrode lines 5X and the unit electrodes 5YU of the sensing electrode lines 5Y is large in a plan view, then if the second interlayer insulating layer 6 were to be made thin, the capacitance would increase, which makes sensing difficult.

As shown in FIG. 6, if the area of overlap between the shield electrode and the unit electrodes 5XU of the drive electrode lines 5X and the unit electrodes 5YU of the sensing electrode lines 5Y is small, then it is possible to form the second interlayer insulating layer 6 thin, and it is possible to make the touch panel substrate 1 as a whole thin while mitigating the effect of noise.

<Embodiment 3>

Embodiment 3 of the present invention will be described with reference to FIG. 7. The touch panel substrate 1b of the present embodiment differs from that of Embodiments 1 and 2 in that protective films made of a PET film that can be bent are provided on the top and bottom surfaces of a touch panel substrate 1b, and in that the touch panel substrate 1b can be formed on a curved surface. Other configurations are the same as described in Embodiment 1. For ease of description, members that have the same functions as members shown in drawings of Embodiment 1 will be assigned the same reference characters, and descriptions thereof will be omitted.

Figure 7:
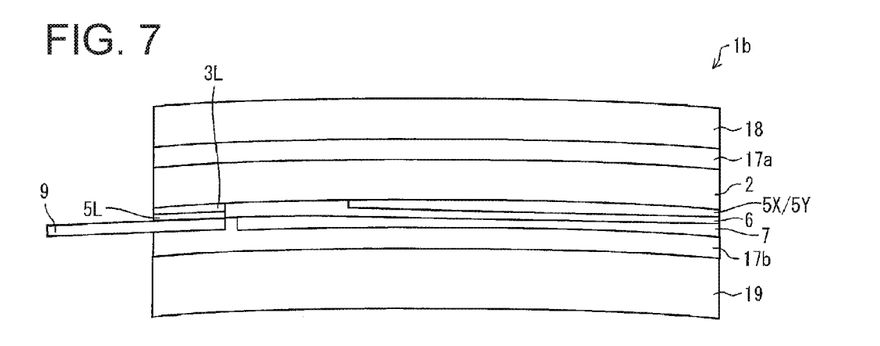
FIG. 7 is a plan view showing a schematic configuration of a touch panel substrate provided in a liquid crystal display device of yet another embodiment of the present invention.

FIG. 7 is a plan view that schematically shows a touch panel substrate 1b.

In the touch panel substrate 1b, after the substrate 2 of the touch panel substrate formed on a support substrate (not shown) and a protective film 19 made of a bendable PET film or the like are bonded together through an adhesive layer 17b and the support substrate (not shown) is removed, the protective film 18 is bonded through an adhesive layer 17a on the surface of the substrate 2 of the touch panel substrate opposite to the surface where the protective film 19 is formed.

By forming the bonding portion (protective film 18) of the touch panel substrate 1b as a flexible substrate, a flexible touch panel substrate 1b can be attained.

Also, in the touch panel substrate 1b, after the respective layers requiring high temperature processes are formed on the support substrate, the protective film 18 made of a flexible PET film or the like is bonded through the adhesive layer, and the support substrate is removed by radiation with light such as a laser, and thus, there is no need to form the ITO layer and the like that forms the unit electrodes 5XU of the drive electrode lines 5X and the unit electrodes 5YU of the sensing electrode lines 5Y at a temperature at or below 150° C., which is the glass transition point Tg of PET films and the like, and thus, a high quality low resistance ITO layer can be formed.

Also, the mounting of the FPC 9 on the support substrate is performed in a step requiring a high temperature process, and thus, when mounting, there is no deformation of the protective film 18 made of a PET film or the like.

The resin substrate of the touch panel substrate of the present invention may be formed by forming a resin layer to be the resin substrate on a support substrate and peeling the resin layer from the support substrate.

According to the configuration above, the resin substrate is formed by forming a resin layer to be the resin substrate on the support substrate and peeling the resin layer from the support substrate, and thus, it is possible to form the resin substrate so as to be thin, and to attain a thin touch panel substrate.

In the touch panel substrate of the present invention, it is preferable that the first insulating layer cover the wiring lines.

According to the configuration above, the respective wiring lines are covered by the first insulating layer, and thus, during patterning of the electrode layer, it is possible for the respective wiring lines to be durable, thereby improving reliability.

In the touch panel substrate of the present invention, it is preferable that the first insulating layer be a resin layer and cover only the connection electrode and the wiring lines.

According to the configuration above, no first insulating layer is present below the unit electrodes of the first electrodes and the unit electrodes of the second electrodes, and thus, it is possible to attain a touch panel substrate having high transmittance and good optical characteristics.

Also, according to the configuration above, the conductive layer that forms the bridge electrodes and the wiring lines, the first insulating layer, and the electrode layer, which allows through visible light and forms the unit electrodes of the first electrodes and the unit electrodes of the second electrodes, are layered in that order, and thus, even when forming the first insulating layer in a prescribed shape, no damage is done to the unit electrodes of the first electrodes and the unit electrodes of the second electrodes.

The first insulating layer is a resin layer, and thus, it is flexible during bonding, and with the first insulating layer, it is also possible to form a touch panel with a curved surface.

It is preferable that the resin substrate of the touch panel substrate of the present invention be formed of polyimide.

According to the configuration above, the resin substrate can be formed so as to be thin using a PET film or the like, for example, and is formed of polyimide, which has excellent durability, and a high quality electrode layer can be formed on the resin substrate, and thus, it is possible to attain a high quality and thin touch panel substrate.

According to the configuration above, the resin substrate can be formed so as to be thin, and thus, it is possible to attain a curved touch panel substrate.

It is preferable that the resin substrate of the touch panel substrate of the present invention further include, over the resin substrate, a second insulating layer that covers at least the position detection electrodes, and a shield electrode layer that covers at least the second insulating layer, the shield electrode layer allowing through visible light.

According to the configuration above, a shield electrode layer that blocks external signal noise is provided, and thus, a touch panel substrate with a high detection accuracy can be attained.

Also, according to the configuration above, the shield electrode layer is provided on one surface of the resin substrate along with the electrode layer, and thus, despite the fact that the shield electrode layer is provided, it is possible to mitigate increased complexity of the terminal installation portion, and it is possible to connect the elements with relative ease.

It is preferable that the touch panel substrate of the present invention further include, over the resin substrate, a second insulating layer that covers at least the position detection electrodes, and a shield electrode layer formed over at least the second insulating layer, the shield electrode layer allowing through visible light, and that the shield electrode layer cover only a portion of the unit electrodes of the first electrodes and the unit electrodes of the second electrodes.

According to the configuration above, the shield electrode layer has a small area of overlap with the unit electrodes of the first electrodes and the unit electrodes of the second electrodes in a plan view, and thus, it is possible to form the second insulating layer so as to be thin, allowing a thin touch panel substrate to be attained.

It is preferable that the shield electrode layer of the touch panel substrate of the present invention have line portions respectively aligned in the first direction and the second direction so as to intersect at the intersections between the first electrodes and the second electrodes.

According to the configuration above, the shield electrode layer has a small area of overlap with the unit electrodes of the first electrodes and the unit electrodes of the second electrodes in a plan view, and has line portions that can be patterned at a high degree of accuracy. Also, the line portions overlap the centers of the unit electrodes of the first electrodes and the unit electrodes of the second electrodes, and thus, it is possible to reduce noise efficiently.

Therefore, it is possible to form the second insulating layer to be thin, and to attain a thin touch panel substrate.

In the touch panel substrate of the present invention, it is preferable that the second insulating layer be a resin layer.

According to the configuration above, the second insulating layer is a resin layer, and thus, it is flexible during bonding, and with the second insulating layer, it is also possible to form a touch panel with a curved surface.

It is preferable that the touch panel substrate of the present invention further include, in a periphery of where the position detection electrodes are formed, a ground potential wiring line that is grounded and that is made of the conductive layer.

According to the configuration above, ground potential wiring lines that are grounded and that are formed of the conductive layer are provided in the periphery of where the position detection electrodes are formed, and thus, it is possible to reduce noise from the horizontal direction, and it is possible to mitigate ESD damage, which can occur during the manufacturing process.

It is preferable that the touch panel substrate of the present invention further include, in a periphery of where the position detection electrodes are formed, a ground potential wiring line that is grounded and that is made of the conductive layer, and that the shield electrode layer be electrically connected to the ground potential wiring line.

According to the configuration above, the shield electrode layer, and the upper conductive layer that forms the ground potential wiring line are formed on one surface of the resin substrate, and thus, it is possible to electrically connect the shield electrode layer to the ground potential wiring line with relative ease.

Also, in this case, by grounding only the terminal portion of the ground potential wiring line, it is possible to also ground the shield electrode layer, and thus, it is possible to simplify the connection between the shield electrode layer and the ground potential wiring line.

In a terminal portion provided on one end of the resin substrate of the touch panel substrate of the present invention, it is preferable that at least either of patterns made of the electrode film and the shield electrode layer be layered on the wiring lines.

According to the configuration above, in the terminal portion provided on one end of the resin substrate, at least one layer among the electrode layer and the shield electrode layer is layered on the respective wiring lines, and thus, a highly reliable terminal portion can be formed, and a highly reliable touch panel substrate can be attained.

In a terminal portion provided on one end of the resin substrate of the touch panel substrate of the present invention, it is preferable that at least either of patterns made of the electrode film and the shield electrode layer be layered on a ground potential wiring line that is made of the conductive layer and that is grounded.

According to the configuration above, on the terminal portion provided on one end of the resin substrate, at least one layer among the electrode layer and the shield electrode layer is layered on the ground potential wiring line, and thus, a highly reliable terminal portion can be formed, and a highly reliable touch panel substrate can be attained.

It is preferable that the resin substrate of the touch panel substrate of the present invention further include a protective layer formed through an adhesive layer on at least one of a topmost layer of the resin substrate on which respective layers are formed, and a side of the resin substrate opposite to the topmost layer.

According to the configuration above, at least one surface of the touch panel substrate has formed thereon a protective layer, and thus, a highly durable and reliable touch panel substrate can be attained.

It is preferable that the resin substrate of the touch panel substrate of the present invention further include a protective layer formed through an adhesive layer on a side of the resin substrate opposite to one side on which respective layers are formed; and a driver circuit on the side on which the respective layers are formed.

According to the configuration above, the one surface of the resin substrate of the touch panel substrate where the respective layers are formed (mounting surface) is disposed opposite to the protective layer, and thus, it is possible to mount the driver circuit (COG (LSI)) without needing to take into account the thickness of the adhesive layer provided between the protective layer and the resin substrate, and thus, it is possible to simplify the peripheral circuitry of the touch panel substrate.

The present invention is not limited to the embodiment described above, and various modifications can be made without departing from the scope of the claims. Therefore, embodiments obtained by appropriately combining the techniques disclosed in different embodiments are included in the technical scope of the present invention.

INDUSTRIAL APPLICABILITY

The present invention can be suitably used in a touch panel and a display device including a touch panel.

DESCRIPTION OF REFERENCE CHARACTERS 1, 1a, 1b touch panel substrate
2 substrate (resin substrate)
3 conductive layer
3b bridge electrode
3L wiring line
3L' ground potential wiring line
4 first interlayer insulating layer (first insulating layer)
5X drive electrode line
5Y sensing electrode line
5XU, 5YU unit electrode
5XC connecting portion
5L electrode layer
6 second interlayer insulating layer (second insulating layer)

7, 7a shield electrode
7L electrode layer
8 support substrate
9, 12 FPC
10 liquid crystal display panel (display panel)
11a, 11b polarizing plate
20, 20a liquid crystal display device
13, 14 adhesive layer
15 protective plate (protective layer)
17a, 17b adhesive layer
18, 19 protective film (protective layer)

The invention claimed is:

1. A touch panel substrate, comprising, over a resin substrate, position detection electrodes that detect a coordinate position of an object to be detected by a change in capacitance,
wherein the resin substrate allows through visible light,
wherein the position detection electrodes include a plurality of first electrodes arranged in a first direction, each of the first electrodes having unit electrodes arranged in a second direction that intersects with the first direction, and a plurality of second electrodes arranged in the second direction, each of the second electrodes having unit electrodes arranged in the first direction,
wherein, at intersections between the first electrodes and the second electrodes, either two adjacent unit electrodes of the first electrodes or two adjacent unit electrodes of the second electrodes that are respectively adjacent to each other in a plan view are electrically connected by a connection electrode made of a conductive layer, the other thereof being electrically connected to each other over a first insulating layer that is formed over the connection electrode,
wherein the unit electrodes of the first electrodes and the unit electrodes of the second electrodes are made of an electrode film that allows through visible light,
wherein the touch panel substrate further includes wiring lines connected to the position detection electrodes in a periphery thereof, the wiring lines being made of said conductive layer,
wherein the touch panel substrate further includes, over the resin substrate, a second insulating layer that covers at least the position detection electrodes, and a shield electrode layer formed over at least a portion of the second insulating layer, the shield electrode layer allowing through visible light,
wherein the shield electrode layer covers only a portion of the unit electrodes of the first electrodes and the unit electrodes of the second electrodes, and
wherein the shields electrode layer has first line portions aligned in the first direction and second line portions aligned in the second direction such that the first line portions and second line portions intersect with each other at the intersections between the first electrodes and the second electrodes.

2. The touch panel substrate according to claim 1, wherein the resin substrate is formed by forming a resin layer to be the resin substrate on a support substrate and peeling the resin layer from the support substrate.

3. The touch panel substrate according to claim 1, wherein the first insulating layer covers the wiring lines.

4. The touch panel substrate according to claim 3, wherein the first insulating layer is a resin layer and covers only the connection electrode and the wiring lines.

5. The touch panel substrate according to claim 1, wherein the resin substrate is made of polyimide.

6. The touch panel substrate according to claim 1, wherein the second insulating layer is a resin layer.

7. The touch panel substrate according to claim 1, further comprising, in a periphery of where the position detection electrodes are formed, a ground potential wiring line that is grounded and that is made of the conductive layer.

8. The touch panel substrate according to claim 7, wherein the shield electrode layer is electrically connected to the ground potential wiring line.

9. The touch panel substrate according to claim 1, wherein, in a terminal portion provided on one end of the resin substrate, at least one of the electrode film and the shield electrode layer is layered on the wiring lines.

10. The touch panel substrate according to claim 1, wherein, in a terminal portion provided on one end of the resin substrate, at least one of the electrode film and the shield electrode layer is layered on a ground potential wiring line that is made of the conductive layer and that is grounded.

11. The touch panel substrate according to claim 1, further comprising a protective layer formed through an adhesive layer on at least one of a topmost layer of the resin substrate on which constituent elements as recited in claim 1 are formed, and a side of the resin substrate opposite to the topmost layer.

12. The touch panel substrate according to claim 1, further comprising: a protective layer formed through an adhesive layer on a side of the resin substrate opposite to one side on which constituent elements as recited in claim 1 are formed; and
a driver circuit on the side on which the respective layers are formed.

* * * * *